US010733851B2

(12) United States Patent
Yajima

(10) Patent No.: US 10,733,851 B2
(45) Date of Patent: Aug. 4, 2020

(54) SALES REGISTRATION APPARATUS

(71) Applicant: TOSHIBA TEC KABUSHIKI KAISHA, Tokyo (JP)

(72) Inventor: Shinsuke Yajima, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/291,444

(22) Filed: Mar. 4, 2019

(65) Prior Publication Data

US 2019/0272715 A1 Sep. 5, 2019

(30) Foreign Application Priority Data

Mar. 5, 2018 (JP) ................................ 2018-038866

(51) Int. Cl.

*G06K 9/00* (2006.01)
*G06Q 20/20* (2012.01)
*G07G 1/00* (2006.01)
*A47F 9/04* (2006.01)
*G07G 1/12* (2006.01)

(52) U.S. Cl.

CPC ............ *G07G 1/0018* (2013.01); *A47F 9/04* (2013.01); *A47F 2009/041* (2013.01); *G07G 1/12* (2013.01)

(58) Field of Classification Search

CPC ............ G06K 7/109; G06K 19/06037; G06K 7/10435
USPC ................. 235/462.14, 462.45, 383; 705/16
See application file for complete search history.

(56) References Cited

U.S. PATENT DOCUMENTS

| | | | | |
|---|---|---|---|---|
| 9,412,045 B2 * | 8/2016 | Kakino | ............... | G06F 16/5854 |
| 9,619,976 B2 * | 4/2017 | Sambe | ............... | G06Q 20/3276 |
| 9,679,282 B2 * | 6/2017 | Urushibata | .......... | G06Q 20/208 |
| 9,990,619 B2 * | 6/2018 | Miyakoshi | ........... | G06Q 20/208 |
| 2017/0061170 A1 | 3/2017 | Hayahi | | |
| 2017/0091797 A1 | 3/2017 | Nodera | | |

FOREIGN PATENT DOCUMENTS

| | | | |
|---|---|---|---|
| DE | 102010039533 | A1 | 1/2012 |
| EP | 3147849 | A1 | 3/2017 |
| GB | 2293307 | A | 3/1996 |
| JP | 2010257120 | A | 11/2010 |

OTHER PUBLICATIONS

Extended European Search Report dated May 27, 2019, mailed in counterpart European Application No. 19160512.0, 7 pages.

* cited by examiner

*Primary Examiner* — Daniel St Cyr
(74) *Attorney, Agent, or Firm* — Kim & Stewart LLP

(57) ABSTRACT

A sales registration apparatus includes a commodity reader and a main body housing the reader. First attachment sections are distributed along a side surface of the main body at a fixed interval in the height direction. Each first attachment section is configured to permit the attachment of an additional component to the side surface. Each first attachment section is within a sub-portion of the side surface having a height that is a fixed unit height or an integer multiple of the fixed unit height. Cover sections are provided with each having a width equal to a width of the side surface and a height that is equal to the fixed unit height or an integer multiple of the fixed unit height. The cover section are attached to the side surface and cover any first attachment section not occupied by an additional component.

20 Claims, 8 Drawing Sheets

SALES REGISTRATION APPARATUS

CROSS-REFERENCE TO RELATED APPLICATION

This application is based upon and claims the benefit of priority from. Japanese Patent Application No. 2018-038866, filed in Mar. 5, 2018, the entire contents of which are incorporated herein by reference.

FIELD

An embodiment described herein relates generally to a sales registration apparatus.

BACKGROUND

A known checkout system uses a sales registration apparatus to register items in a sales transaction and a separate accounting apparatus to perform settlement processing on the basis of sales registration data acquired from the sales registration apparatus via a network. In such a checkout system, a configuration in which a plurality of store clerks divide the labor of item registration and transaction settlement (a two-person work type) or a configuration in which the customer performs transaction settlement (a semi-self-service type) can be adopted.

In such a checkout system, a sales registration apparatus of a type called vertical scanner is often used for purposes of space saving. For a vertical scanner, there is known a configuration in which a reading device is housed in a main body section disposed on a checkout counter and a display device is provided above the main body section. An attachment section for attaching an additional (e.g., optional) component may be provided on a side surface of the main body section, or more broadly a housing including the main body section. For example, a holder for storing a hand scanner can be attached to the attachment section.

However, if an additional component will not be used or otherwise present, then the attachment section for attaching the additional component might be left exposed or otherwise unused. If the attachment section is left exposed, the sales registration apparatus may appear unfinished or improperly designed. Additionally, if the attachment section comprises a screw hole or the like, then the attachment section provides an inlet for intrusion of dust into the inside of a main body. Therefore, it is generally desirable to cover the unused attachment section with a cover member or the like.

However, since a region on the side surface of the main body section may include several attachment portions providing several possible installation positions for an additional component, the side surface of the main body be may be interrupted by the presence of an additional component attached to one or the other of the attachment portions. As such the side surface may not be coverable with a single cover member. For example, if a setting height for the additional component is adjustable, the sizes of the divided regions on either side of the additional component changes according to the setting height. Therefore, if the size of the cover member is carelessly designed, it is possible that the entire region corresponding to the attachment section (s) cannot be covered with the cover member.

DETAILED DESCRIPTION

In general, according to one embodiment, a sales registration apparatus comprises a reader to read information from a commodity and a main body for housing the reader. The main body is configured to be disposed on an upper surface of a checkout counter. The main boding extends from the upper surface of the checkout counter in a height direction. A plurality of first attachment sections is distributed along a side surface of the main body in the height direction at a fixed interval in the height direction. Each first attachment section is configured to permit the attachment of an additional component to the side surface at a position of the first attachment section. Each first attachment section is within a sub-portion of the side surface having a height that is a fixed unit height or an integer multiple of the fixed unit height. A plurality of cover sections each have a panel surface having a width substantially equal to a width of the side surface of the main body and a height that is substantially equal to the fixed unit height or an integer multiple of the fixed unit height. The cover sections are attached to the side surface of the main body section and cover any first attachment section to which an additional component is not presently attached.

A sales registration apparatus according to an example embodiment is explained in detail below with reference to the accompanying drawings. In an example embodiment, a sales registration apparatus used in checkout systems of a two-person work type, a semi-self-service type, or the like is explained. However, the present disclosure is not limited to this example.

Figure 1:
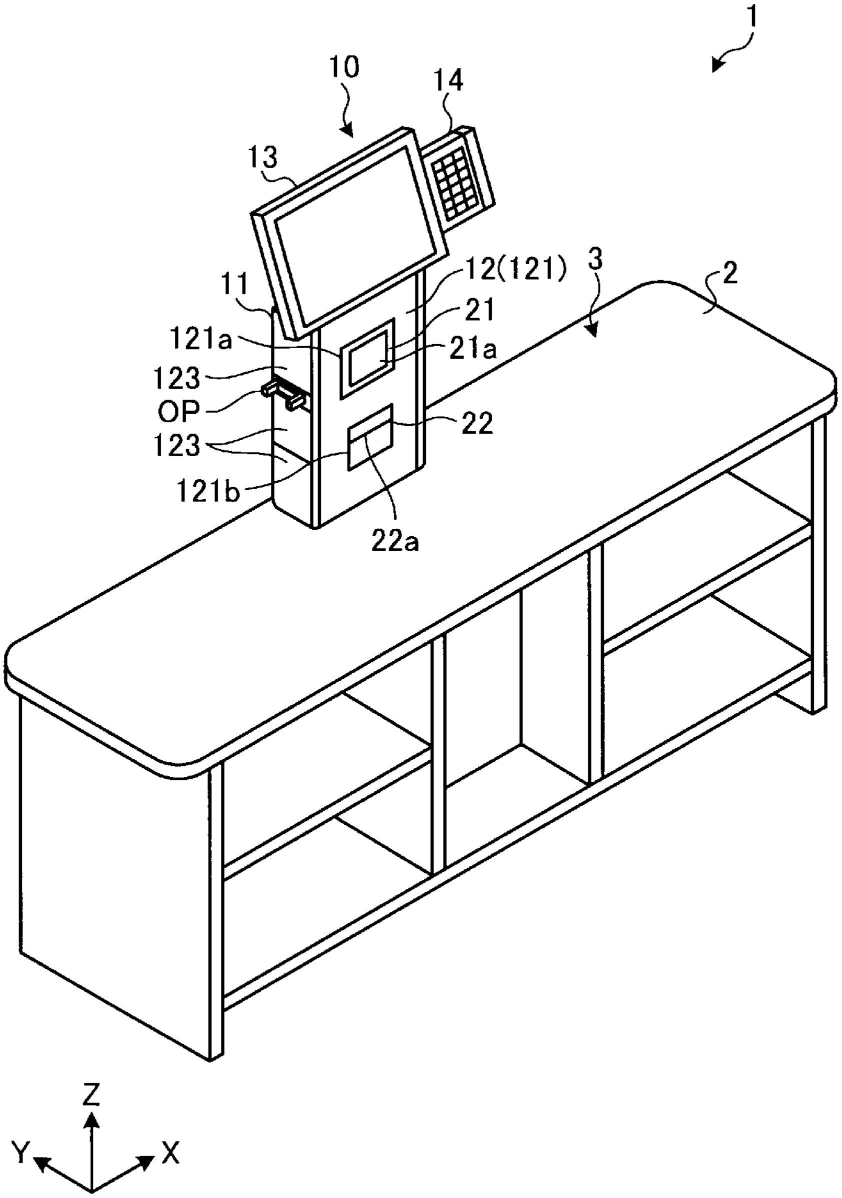
FIG. 1 depicts a checkout system according to an embodiment.
Figure 2:
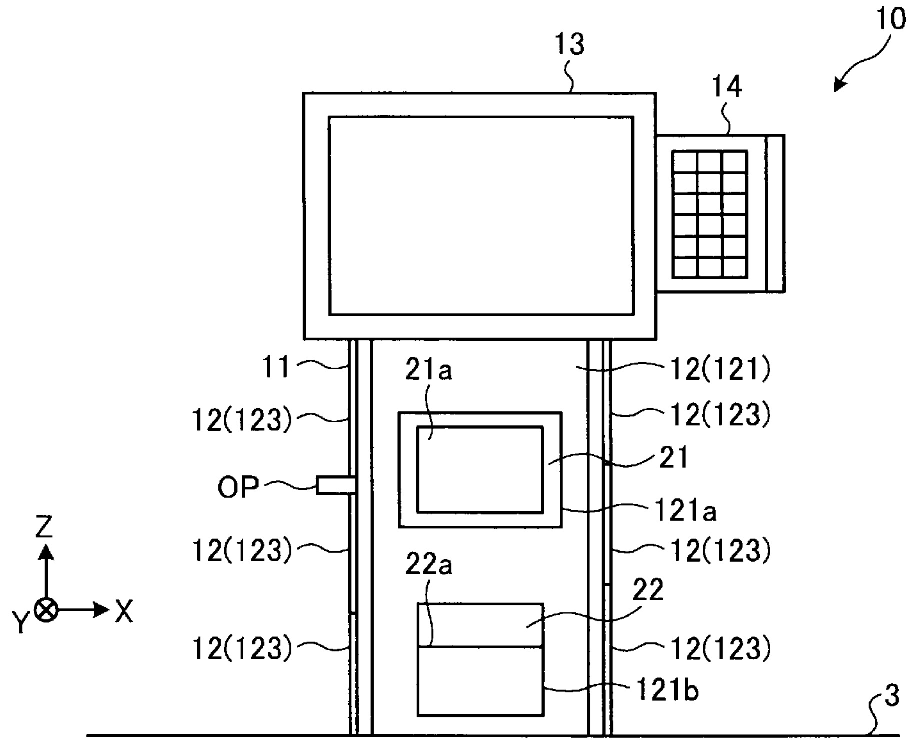
FIG. 2 depicts a front view of a sales registration apparatus.
Figure 3:
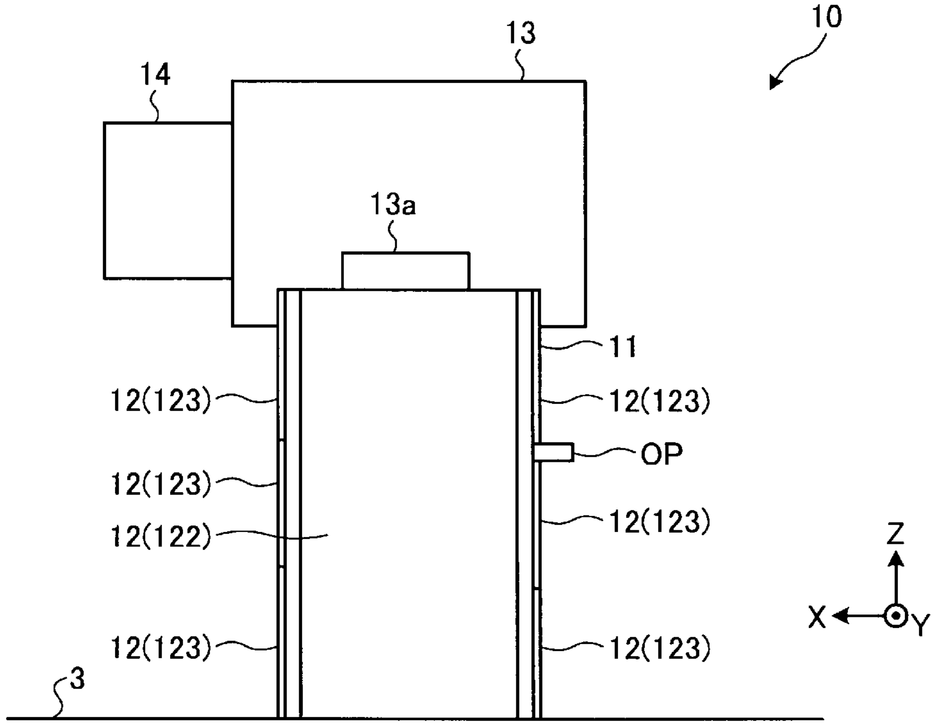
FIG. 3 is a back view of a sales registration apparatus.

FIG. 1 is a perspective view illustrating an example of a checkout system 1 according to an embodiment. FIG. 2 is a view of a sales registration apparatus 10 illustrated in FIG. 1 viewed from the front side (an operator side). FIG. 3 is a view of the sales registration apparatus 10 illustrated in FIG. 1 viewed from the back side (a customer side).

The checkout system 1 includes a checkout counter 2 having a rectangular table shape. A flat loading surface 3 is on the upper surface of the checkout counter 2. A shopping basket or the like that stores commodities to be purchased by a customer can be placed on the loading surface 3.

The sales registration apparatus 10 is set in a substantially center region in the length direction of the checkout counter 2. The sales registration apparatus 10 is a vertical-type scanner apparatus, also referred to as a vertical scanner 10 in some contexts. The sales registration apparatus 10 is located on the far side on the loading surface 3 as viewed from the operator side. The sales registration apparatus 10 is communicably connected to an external apparatus such as a settlement terminal.

The sales registration apparatus 10 comprises a housing 11 disposed on the loading surface 3. The housing 11 houses various devices, components, or the like related to the operation of the sales registration apparatus 10. The housing 11 includes, for example, a reading section 21 and a printer section 22 on the inside.

The reading section 21 is a reading device that reads, via a reading window 21*a*, information concerning a commodity (e.g., product/item for sale at a retail store) such as a code symbol attached to the commodity or other characteristic of the commodity. The commodity information read from the commodity can be used for sales registration process. The reading section 21 includes a light that supplies a reading light from the reading window 21*a*, an image sensor that receives reflected reading light, and a decoder that executes decode processing on an output signal of the image sensor.

The printer section 22 is a printer device that prints a printout such as a receipt. The printer section 22 includes a paper storing section for storing paper, a conveying section that conveys the paper from the paper storing section to a paper discharge port 22*a*, and a printing unit that performs printing on the paper.

Panel sections 12 (which include a front panel 121, a back panel 122, and side panels 123) are detachably attached to the surfaces of the housing 11. The panel sections 12 may also be referred to as a cover section 12 or a cover member 12 in some contexts. The panel sections 12 cover the surfaces (front, back, left, right) of the housing 11. Each panel section 12 is formed of a plate-like resin member or the like. In the front panel 121, opening sections 121*a* and 121*b* such that portions of the reading section 21 and the printer section 22 can be exposed therethrough.

A display section 13 is attached to an upper part of the housing 11. The display section 13 is a display device including a display such as a liquid crystal display. The display section 13 extends beyond the front surface of the housing 11 towards the operator side. A front portion of the display section 13 is inclined. The display section 13 is used as a display for an operator (e.g., a store clerk) who operates the sales registration apparatus 10. The display section 13 may have a touch panel configuration. The display section 13 may include a power supply unit of the sales registration apparatus 10 and a control unit for the sales registration apparatus 10 comprising by a CPU (Central Processing Unit), a ROM (Read Only Memory), and a RAM (Random Access Memory).

An operation panel 14 is provided adjacent to the display section 13. In FIG. 1, the operation panel 14 is provided on the right of the display section 13 when viewed from the operator side. The operation panel 14 includes an input device such as a keypad.

An additional component OP for adding a particular function to the sales registration apparatus 10 can optionally be attached to a side surface of the housing 11. In FIG. 1, an example is illustrated in which a holder for a hand scanner (not illustrated in FIG. 1) has been attached as an additional component OP. With a holder, the sales registration apparatus 10 has an additional function of holding a hand scanner. The additional component OP is not limited, in type or position, to the example illustrated in FIG. 1. Other instruments/components/fixtures may be attached as an additional component OP. For example, the additional component OP may be shelf section or the like having a placement surface extending in a horizontal direction from the side surface of the housing 11.

On the loading surface 3, a through-hole into which foot sections 113 of the housing 11 are to be inserted is formed. By inserting the foot sections 113 of the housing 11 into the through-hole of the loading surface 3, the housing 11 is fixed on the loading surface 3. The height of the sales registration apparatus 10 above the loading surface 3 is desirably set to approximately eye-level of the operator.

The possible configuration of the sales registration apparatus 10 is not limited to the example explained above. For example, the sales registration apparatus 10 may also include a display screen of which is directed towards the customer side (a customer display section). The customer display section can be attached to, for example, the back of the display section 13 or the operation panel 14.

Figure 4:
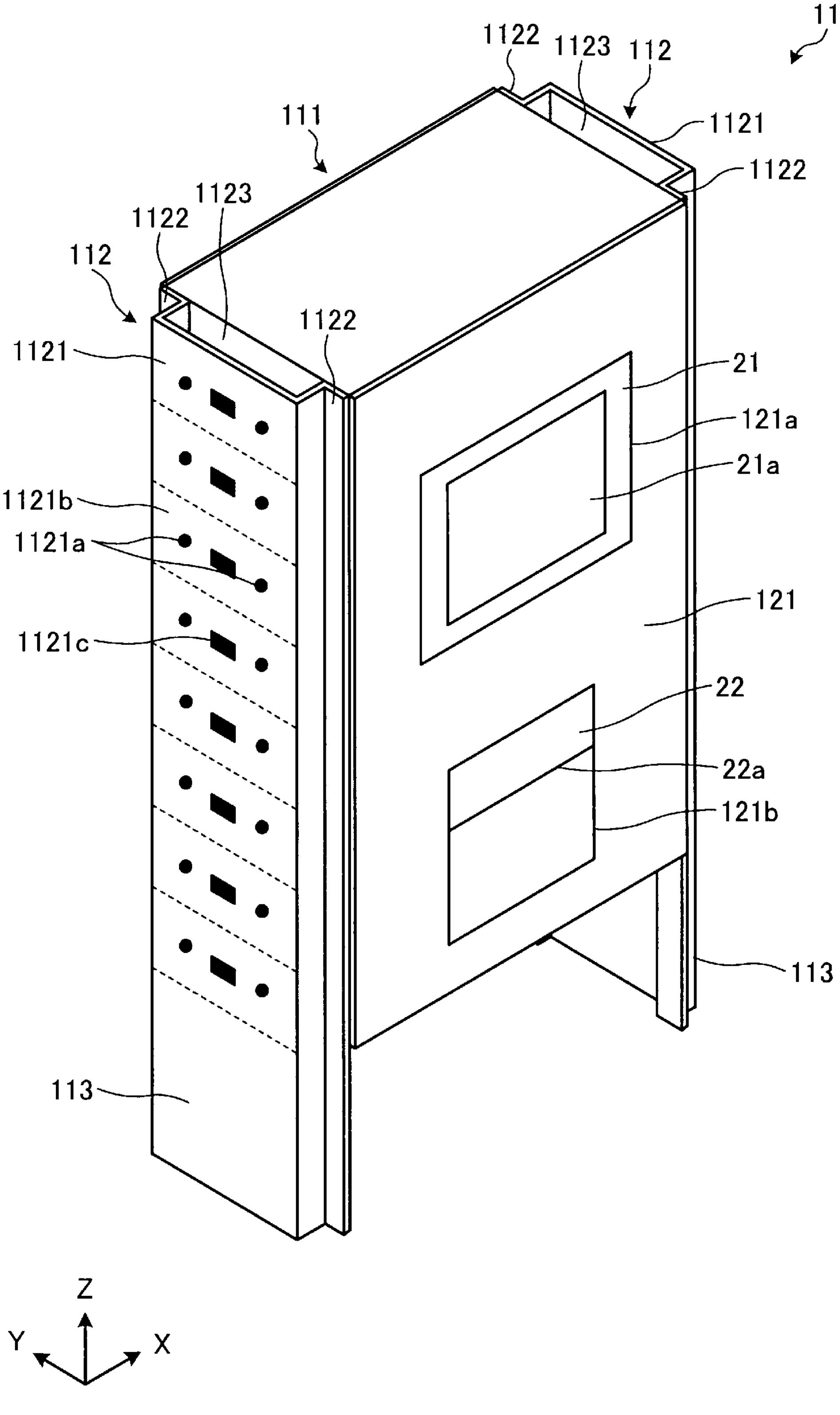
FIG. 4 is a perspective view illustrating an example of a housing.

The configuration of the sales registration apparatus 10, more particularly the housing 11, is explained with reference to FIG. 4. FIG. 4 is a perspective view illustrating an example of a housing 11. In FIG. 4, a state is illustrated for purposes of explanation in which the side panel 123, the display section 13, the operation panel 14, and the additional component OP have been removed from (or not yet attached to) the sales registration apparatus 10.

As illustrated in FIG. 4, the housing 11 includes a main body section 111 and supporting sections 112. The main body section 111 has a substantially box-like shape long in the height direction (Z direction). The main body section 111 houses devices such as the reading section 21 and the printer section 22 on the inside.

The devices housed by the main body section 111 are not limited to the reading section 21 and the printer section 22. The main body section 111 may also house a control unit, a power supply unit, or the like. The display section 13 will be attached to the upper surface of the main body section 111. Specifically, the display section 13 is attached to the upper surface of the main body section 111 using, for example, a holder 13*a* (see FIG. 3) including a tilt mechanism and the like.

The supporting sections 112 are attached to both side surfaces of the main body section 111. The supporting sections 112 are horseshoe-shaped in cross section taken across the height direction. The supporting sections 112 are formed by, for example, a metal plate. The supporting sections 112 support the main body section 111 from the side.

Specifically, the supporting sections 112 each include side surface sections 1121 (a cross section of which has a C shape) and extended sections 1122 extended toward the outer side from both edges of the side surface sections 1121. The side surface sections 1121 form the side surfaces of the housing 11 when the supporting sections 112 have been attached to the main body section 111. The extended sections 1122 are parts joined to the main body section 111 when the supporting sections 112 are attached to the main body section 111. The width (Y direction) of the supporting sections 112 is substantially equal to the width (Y direction) of the main body section 111. The length (Z direction) of the supporting sections 112 is longer than the length (Z direction) of the main body section 111.

The supporting sections 112 are fixed (joined) to the side surfaces of the main body section 111 by welding, screwing, or the like. Specifically, when the upper ends of the supporting sections 112 are aligned to the upper surface of the main body section 111, the extended sections 1122 can be joined to the side surfaces of the main body section 111 along the height (Z direction) of the main body section 111. That is, the supporting sections 112 are attached such that recessed sides of C-shaped step surfaces are opposed to the side surfaces of the main body section 111.

Lower end portions of the supporting sections 112 project beyond the lower surface of the main body section 111 are utilized as the foot sections 113 of the housing 11. The foot sections 113 are inserted into the through-hole of the loading surface 3 for mounting of the housing 11. Consequently, the supporting sections 112 are fixed to the loading surface 3, more broadly the checkout counter 2.

By integrating the main body section 111 and the supporting sections 112 in the described manner, gaps 1123 are formed along the height direction of the main body section 111 between the side surfaces of the main body section 111 and the side surface sections 1121. The gaps 1123 are connected to cable holes (not illustrated in FIG. 4) on the side surfaces of the main body section 111 and can function as wiring paths. Consequently, in the housing 11, wiring between the main body section 111 and the display section 13 can be performed via the gaps 1123.

First attachment sections 1121*a* (to which the additional component OP can eventually be attached) are provided on the side surface sections 1121. The first attachment sections 1121*a* are, for example, screw holes. The first attachment sections 1121*a* are provided in each of attachment regions 1121*b*, which are distributed along the height direction (Z direction) of the side surface sections 1121.

The attachment regions 1121*b* are provided for potential attachment of the additional component OP. The attachment regions 1121*b* are sized by dividing the long dimension of the side surface sections 1121 by a predetermined dimension. The predetermined dimension serving as the basis of the division can be set on the basis of an expected or required size permitting installation of the additional component OP to the side surface section 1121. In FIG. 4, the attachment regions 1121*b* are indicated by broken lines. An example in which eight attachment regions 1121*b* are set is illustrated.

The additional component OP is attached to the first attachment sections 1121*a* provided on the side surface section 1121 by screwing or the like. That is, a setting height of the additional component OP can be adjusted according to the height of the selected first attachment sections 1121*a* to which the additional component OP is attached.

In FIG. 4, an example is illustrated in which eight first attachment sections 1121*a* (one in each of the attachment regions 1121*b*) are provided in a region of the side surface section 1121 excluding the foot sections 113. However, non-attachment regions (regions where the first attachment sections 1121*a* are not provided) may be set in regions that will be close to the loading surface 3. In this case, the size in the height direction for the non-attachment regions is desirably set integer multiple of the size in the height direction of one attachment region 1121*b*.

The first attachment sections 1121*a* to which the additional component OP is not attached are left exposed on the side surface of the housing 11. If the first attachment sections 1121*a* are exposed, the appearance of the sales registration apparatus 10 is likely to be considered deteriorated. Furthermore, if the first attachment sections 1121*a* are configured by screw holes or the like, then the exposed first attachment sections 1121*a* are likely to be inlets for intrusion of dust into the main body section 111.

However, in the sales registration apparatus 10, second attachment sections 1121*c* are provided on the side surface sections 1121 for detachably attaching the side panels 123 to the housing 11. The second attachment sections 1121*c* are, for example, locking holes (recessed sections) for insertion of a snap-fit type structure or the like.

The second attachment sections 1121*c* are provided in each of the attachment regions 1121*b*. In FIG. 4, an example is illustrated in which one second attachment section 1121*c* is provided in the center of each attachment region 1121*b* between the first attachment sections 1121*a* on the left and the right. Positions and the numbers of the second attachment sections 1121*c* are not limited to this. However, it is desirable to provide the second attachment sections 1121*c* in positions within the attachment regions 1121*b* that would be hidden upon attachment of the attachment component OP to the first attachment sections 1121*a* of the respective attachment region 1121*b*.

The second attachment sections 1121*c* may be holes, grooves, or the like provided along the height direction of the supporting sections 112. In some examples, the second attachment sections 1121*c* may be provided in only a subset of attachment regions 1121*b*. However, in general, even when the non-attachment regions are provided, it is desirable to provide the second attachment sections 1121*c* in the non-attachment regions as well as each attachment region 1121*b* such that the entire side surface section 1121 (excluding foot section 113) can be covered with side panels 123.

Figure 5:
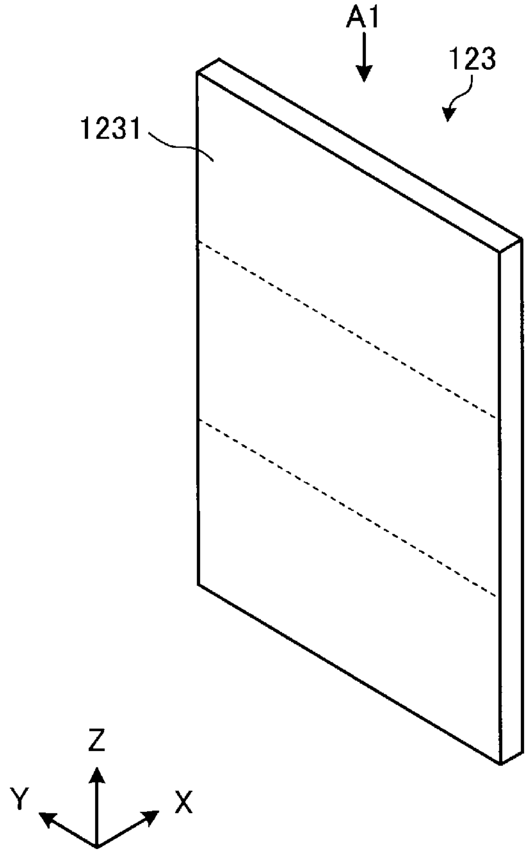
FIG. 5 depicts a side panel according to an embodiment.
Figure 6:
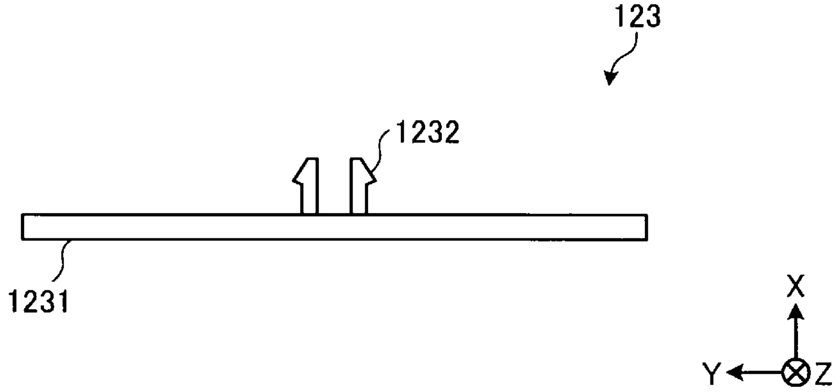
FIG. 6 is a view of the side panel illustrated in FIG. 5 viewed from the A1 direction.

The side panel 123 is explained with reference to FIGS. 5 and 6. FIG. 5 is a perspective view illustrating an example of an exterior configuration of a side panel 123. FIG. 6 is a view of the side panel 123 illustrated in FIG. 5 viewed from an A1 direction.

The side panel 123 is an example of a cover section. If the side panels 123 are attached to the supporting section 112. Each side panel 123 includes, as a principal plane, a panel surface 1231 serving, ultimately, as an outer surface of the housing 11.

The width of the panel surface 1231 is substantially equal to width of the side surface section 1121. The length (installed Z-direction dimension) of the panel surface 1231 is set based on the height of the attachment regions 1121*b*. Specifically, the length of the panel surface 1231 is set to an integer multiple (or substantially so) of the height of the attachment region 1121*b*.

A conceptual range for the length of a panel 123 from equal to the height (Z direction) of a single (integer=1 multiple) attachment region 1121*b* to equal to the combined height (Z direction) of every attachment region 1121*b* (plus the height of any non-attachment region) on a side surface section 1121. However, in general, the maximum multiple (full length panel 123) may not be used if an additional component OP is to be attached to the side surface section 1121.

In FIG. 5, regions equivalent to the attachment regions 1121*b* are indicated by broken lines. The depicted panel surface 1231 is formed in a size corresponding to three attachment regions 1121*b*. In the following explanation, a side panel 123 including the panel surface 1231 having a size of N times (where N is an integer) the height of an attachment region 1121*b* is referred to as a side panel 123 having an N-times size.

An attachment section 1232 is provided on the rear surface side of the panel surface 1231. The attachment section 1232 is, for example, a hook, a projection, or a snap-fit structure configured to engage with mate to a second attachment section 1121*c*. The attachment section 1232 can be detachably engaged by the second attachment section 1121*c* of the supporting section 112.

The positions where the attachment section 1232 is set and the number of attachment section 1232 are not particularly limited. However, the attachment section 1232 should be provided in a position corresponding to the second attachment section 1121*c* to permit installation of the side panel 123 on the supporting section 112. When the side panel 123 is attached, the attachment section 1232 positioned to coincide with an attachment region 1121*b* having a corresponding size and/or shape. The attachment section 1232 may be positioned on the side panel 123 in such a manner as to permit the side panel 123 to be installed in either of a notionally upwards (up-down) orientation or the reverse (down-up) orientation without notice. Specifically, the attachment section 1232 may be set in the center of the panel surface 1231 and parts point-symmetrical with respect to the center.

A plurality of side panels 123 are prepared. For example, a plurality of side panels 123 having a 1-times size is prepared. A plurality of side panels 123 having double sizes (2-times size) is prepared, and a plurality of side panels 123 having triple sizes (3-times size) is prepared. Thus, the additional component OP can be attached at any height, and the side panels 123 can be provided in numbers and sizes number for covering both the side surfaces of the housing 11.

In general, it is preferable to include the side panels 123 having different sizes rather than setting the sizes of all the side panels 123 to 1-times size to reduce the total number of the side panels 123 required to cover the side surfaces of the housing. A reduced total number of side panels 123 may be cheaper to produce, ship, and/or install.

For example, if eight attachment regions 1121*b* are present on the side surface section 1121 (as illustrated in FIG. 4), one side panel 123 having the 1-times size, two side panels 123 of the 2-times size, and two side panels 123 of the 3-times size are provided for a side surface of the housing 11. With these three sizes of the side panels 123, all remaining regions can be covered by the side panels 123 no matter at which height the additional component OP is attached.

Figure 7:
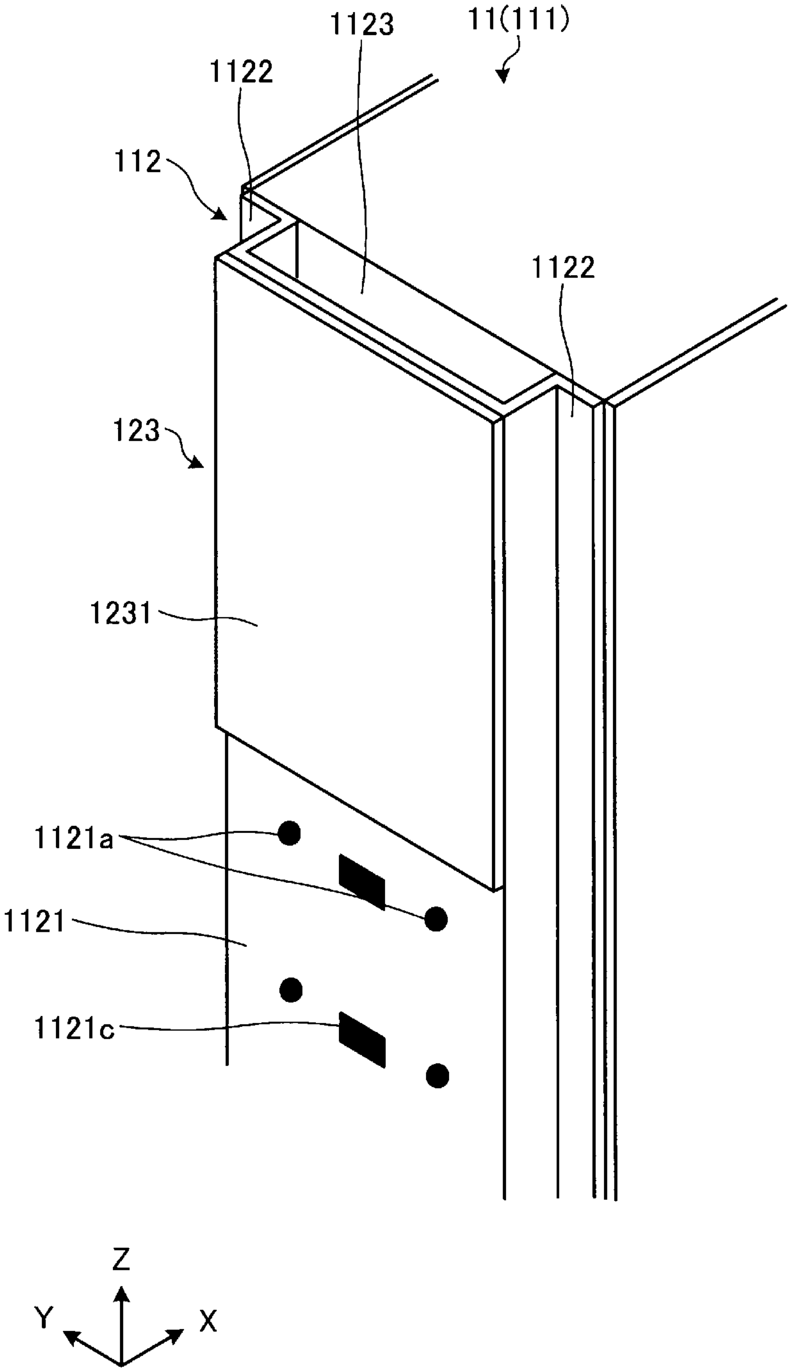
FIG. 7 depicts a side panel attached to a supporting section.
Figure 8:
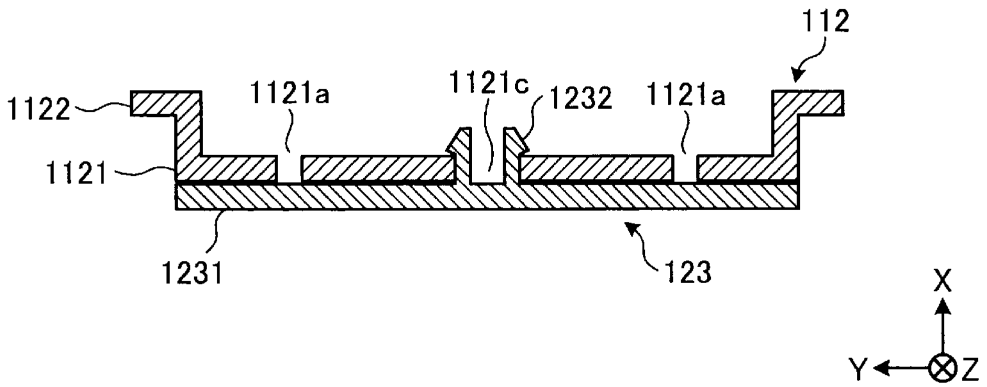
FIG. 8 depicts a cross section of a supporting section and an attachment portion of a side panel.

An attachment method of the side panel 123 is explained. FIG. 7 is a perspective view illustrating a side panel 123 attached to the supporting section 112. FIG. 8 is a cross section of an attachment portion of the supporting section 112 and a side panel 123.

As illustrated in FIG. 7, the side panel 123 is attached to the side surface section 1121 in a state in which the panel surface 1231 forms an outer surface of the housing 11 (the main body section 111). As depicted, the attachment section 1232 on the rear surface side of the panel surface 1231 is locked/engaged by the second attachment section 1121*c* of the side surface section 1121.

FIG. 8 illustrates an example in which the second attachment section 1121*c* and the attachment section 1232 are formed in a snap-fit structure. As illustrated in FIG. 8, the attachment section 1232 includes a projecting section. By fitting and hooking the projecting section in the recessed section of the second attachment section 1121*c*, the side panel 123 is attached to the supporting section 112. The side panel 123 can be detached from the supporting section 112 by applying a force to the projecting section of attachment section 1232 in the center direction of the second attachment section 1121*c*. In this manner, the projecting section of the attachment section 1232 can be detached from the recessed section of the second attachment section 1121*c*. Consequently, the side panel 123 can be attached to and detached from the side surface of the housing 11.

Figure 9:
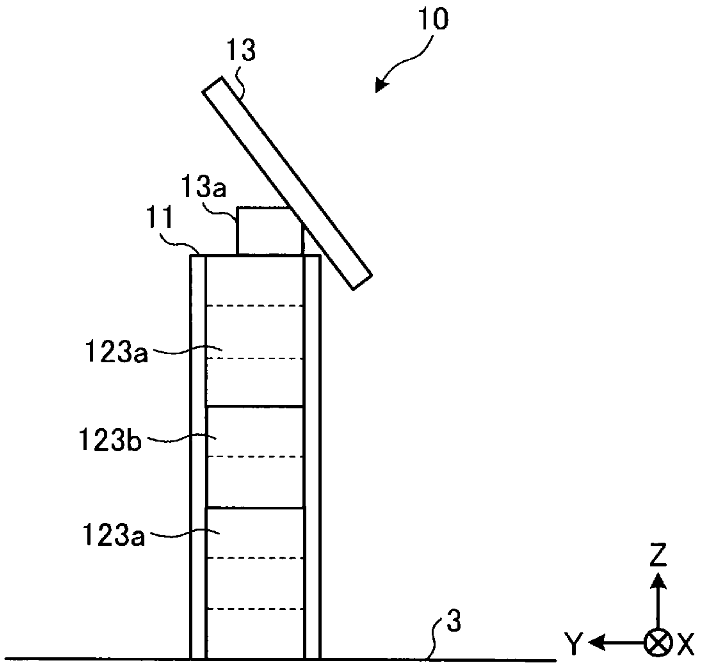
FIG. 9 depicts a side surface of a sales registration apparatus to which a side panel has been attached.
Figure 10:
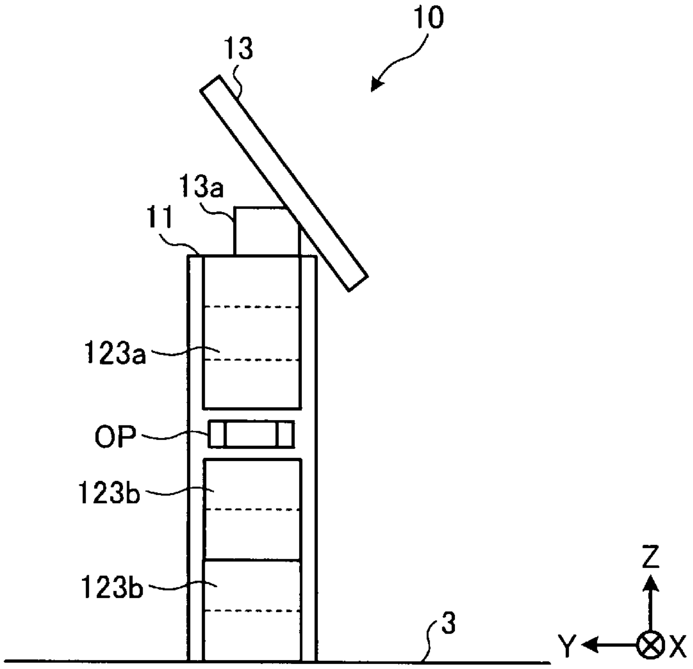
FIG. 10 depicts one example of a side surface of a sales registration apparatus to which a side panel and an optional component has been attached.
Figure 11:
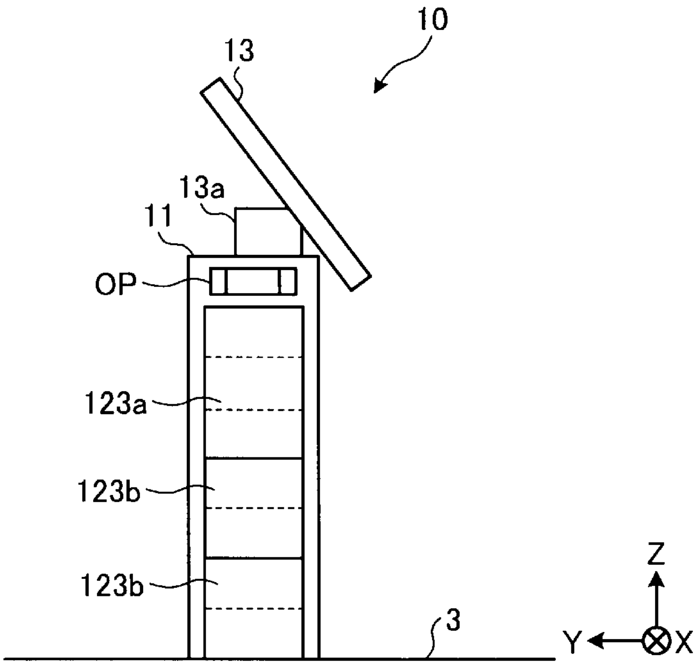
FIG. 11 depicts another example of a side surface of a sales registration apparatus to which a side panel and an optional component has been attached.

As illustrated in FIGS. 9 to 11, a plurality of side panels 123 are attached over the height direction of the side surface of the housing 11 to cover the side surface. FIGS. 9 to 11 are diagrams schematically illustrating example configurations of the side surface of the sales registration apparatus 10. In FIGS. 9 to 11, an example is illustrated in which the eight attachment regions 1121*b* explained with reference to FIG. 4 are set on the side surface (more particularly, the side surface section 1121) of the housing 11. Regions corresponding to the size of an attachment region 1121*b* are indicated by broken lines in FIGS. 9-11.

FIG. 9 is a diagram illustrating a state in which the additional component OP is not attached. In FIG. 9, a side panel 123*a* having a triple size, a side panel 123*b* having a double size, and another side panel 123*a* having the triple size are attached in the stated order from the top of the housing 11. In this way, the side surface of the housing 11 is covered by two kinds of the side panels 123 (side panel 123*a* type and side panel 123*b* type) having different sizes. The possible attachment order of the side panels 123 is not limited to that depicted in FIG. 9. The side panels 123 may instead be attached in the order of the triple size, the triple size, and the double size or in the order of the double size, the triple size, and the triple size.

FIG. 10 illustrates an example in which an additional component OP is attached to the fourth attachment region 1121*b* from the top from among the eight attachment regions 1121*b* present on the side surface section 1121 of the housing 11. In this case, the side surface of the housing 11 can be covered by attaching a side panel 123*a* having the triple size, a side panel 123*b* having the double size, and another side panel 123*b* having the double size in the stated order from the top of the housing 11. FIG. 11 illustrates an example in which an additional component OP is attached to the first attachment region 1121*b* from the top from among the eight attachment regions 1121*b* present on the side surface section 1121 of the housing 11. In this case, the side surface of the housing 11 can be covered by attaching a side panel 123*a* having the triple size, a side panel 123*b* having the double size, and another side panel 123*b* having the double size in the stated order from the top of the housing.

As explained above, the sales registration apparatus 10 includes, on the side surface of the housing 11, the first attachment sections 1121*a* for attaching the additional component OP at various height positions (in units corresponding to the height of the attachment region 1121*b*) and likewise the second attachment sections 1121*c* for attaching the side panels 123. In the sales registration apparatus 10, a side panel 123 having size based on the height of the attachment region 1121*b* can be detachably attached to the regions where the additional component OP is not attached on the side surface of the housing 11.

Consequently, even if the side surface of the housing 11 is interrupted by the presence of an additional component OP, the regions where the additional component OP is not attached can be covered by using side panels 123. In the sales registration apparatus 10, even if the setting height position of the additional component OP is changed, the regions where the additional component OP is not attached can be covered by combining side panels 123 of different sizes (integer multiples of the height of the attachment region 1121*b*). Therefore, in the sales registration apparatus 10, the side surface of the housing 11 (the main body section 111) to which the additional component OP has been attached can be efficiently covered by side panels 123.

In the sales registration apparatus 10, the second attachment section 1121*c* can be provided in the part hidden/covered by the attached additional component OP. Therefore, it is possible to prevent any second attachment section 1121*c* from being left exposed by the attachment of the additional component OP.

In the example embodiment, only one additional component OP is attached to one side surface of the housing 11 (see FIGS. 7 to 9). However, the number and position of additional components OP is not limited to this. For example, the one additional component OP may be attached to each of the side surfaces of the housing 11. Similarly, a plurality of additional components OP may be attached to one or both of the side surfaces of the housing 11. In all cases, the regions where an additional component OP has not been attached can be covered using the side panels 123 explained above.

The cross-sectional shape of the supporting sections 112 is not limited to the example embodiment. For example, the supporting sections 112 may be a tubular member such as a square pipe having a hollow region on the inside. In this case, the cross-sectional shape of the supporting sections 112 does not particularly matter so long as supporting sections 112 have a shape to which the main body section 111, the side panels 123, and an additional component OP can be attached. The supporting sections 112 include, on the surface sides attached to the main body section 111, through-holes communicating with the cable holes on the side surfaces of the main body section 111. The supporting sections 112 include, on the surface sides serving as the side surfaces of the housing 11, the first attachment sections 1121*a*, the second attachment sections 1121*c*, and the like which are described above. Consequently, gaps 1123 could be formed between the supporting sections 112 and the main body section 111 by inclusion of hollow regions in the supporting sections 112.

In the example embodiment, the panel surface 1231 of the side panel 123 is a flat surface. However, but the present disclosure is not limited to this, the panel surface 1231 may be a surface on which a groove or the like is cut, a curved surface, or the like.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions, and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A sales registration apparatus, comprising:
- a reader to read information from a commodity;
- a main body housing the reader and configured to be disposed on an upper surface of a checkout counter, the main body extending from the upper surface in a height direction;
- a plurality of first attachment sections distributed along a side surface of the main body in the height direction at a fixed interval in the height direction, each first attachment region configured to permit the attachment of an additional component to the side surface at a position thereof and each being within a sub-portion of the side surface having a height that is a fixed unit height or an integer multiple of the fixed unit height; and
- a plurality of cover sections each having a panel surface having a width substantially equal to a width of the side surface of the main body and a height that is substantially equal to the fixed unit height or an integer multiple of the fixed unit height, wherein
- the plurality of cover sections is attached to the side surface of the main body and covers any first attachment section to which an additional component is not attached.

2. The sales registration apparatus according to claim 1, wherein
- the additional component is attached to one of the plurality of first attachment sections, and
- the additional component covers only the one of the plurality of first attachment sections to which it is attached.

3. The sales registration apparatus according to claim 2, wherein the additional component is a holder for a hand-held type scanner.

4. The sales registration apparatus according to claim 2, wherein the additional component is attached to the one of the plurality of first attachment sections with screws.

5. The sales registration apparatus according to claim 1, wherein each first attachment section comprises a plurality of holes in the side surface of the main body.

6. The sales registration apparatus according to claim 1, wherein at least one cover section in the plurality of cover sections has a height that is at least twice the fixed unit height.

7. The sales registration apparatus according to claim 1, wherein the plurality of cover sections comprise resin panels.

8. The sales registration apparatus according to claim 1, wherein the plurality of cover sections each have a substantially flat panel surface.

9. The sales registration apparatus according to claim 1, further comprising:
- a printer in the main body; and
- a display mount at an upper end of the main body.

10. The sales registration apparatus according to claim 1, wherein the side surface of the main body is formed of a metal support section having a C shape facing towards an interior of the main body.

11. The sales registration apparatus according to claim 1, wherein at the plurality of cover sections includes at least two kinds of cover sections having different panel surface heights.

12. The sales registration apparatus according to claim 1, wherein
- the plurality of first attachment sections consist of eight first attachment sections in total equally spaced along the side surface,
- the additional component is attached to the fourth first attachment from an upper end of the main body, and
- the plurality of cover sections consists of three cover sections in total.

13. The sale registration apparatus according to claim 1, wherein each cover section is configured to be detachably attached to the side surface of the main body.

14. The sales registration apparatus according to claim 1, further comprising:
- a second attachment section on the side surface of the main body in a part covered by the additional component when the additional component is attached, the second attachment section permitting a cover section to be detachably attached otherwise.

15. The sales registration apparatus according to claim 1, further comprising:

a plurality of holes in the side surface configured to permit a cover section to be detachably attached to the side surface using a snap-fit type engagement structure.

16. A vertical scanner, comprising:

a scanner to read information from a commodity;

a main body housing the scanner and configured to be disposed on an upper surface of a checkout counter, the main body extending from the upper surface in a height direction;

a display mount on an upper end portion of the main body;

a plurality of first attachment sections in a side surface of the main body and distributed along the side surface in the height direction at a fixed interval in the height direction, each first attachment section configured to permit the attachment of an additional component to the side surface at a position of the first attachment section and each being within a sub-portion of the side surface having a height that is a fixed unit height or an integer multiple of the fixed unit height;

a plurality of second attachment section distributed along the height direction of the side surface of the main body at the fixed interval;

an additional component attached to one of the first attachment sections; and a plurality of cover sections each having a panel surface having a width substantially equal to a width of the side surface of the main body and a height that is substantially equal to the fixed unit height or an integer multiple of the fixed unit height, wherein the plurality of cover sections is attached to the side surface of the main body using the plurality of second attachment sections to cover any first attachment section to which an additional component is not attached.

17. The vertical scanner according to claim 16, wherein the additional component is a holder for a hand-held type scanner.

18. The vertical scanner according to claim 16, wherein the second attachment sections are configured to permit a cover section to be detachably attached to the side surface using a snap-fit type engagement structure.

19. A checkout apparatus, comprising:

a checkout counter having an upper surface; and a sales registration apparatus mounted to the upper surface of the checkout counter and including:

a reader to read information from a commodity;

a main body housing the reader and disposed on the upper surface of the checkout counter, the main body extending from the upper surface in a height direction;

a plurality of first attachment sections distributed along a side surface of the main body in the height direction at a fixed interval in the height direction, each first attachment section configured to permit the attachment of an additional component to the side surface at a position of the first attachment section and each being within a sub-portion of the side surface having a height that is a fixed unit height or an integer multiple of the fixed unit height; and a plurality of cover sections each having a panel surface having a width substantially equal to a width of the side surface of the main body and a height that is substantially equal to the fixed unit height or an integer multiple of the fixed unit height, wherein the plurality of cover sections is attached to the side surface of the main body and covers any first attachment section to which an additional component is not attached.

20. The checkout apparatus according to claim 19, wherein the additional component is attached to one of the first attachment sections, and the additional component is a holder for a hand-held type scanner.

* * * * *